(No Model.) 2 Sheets—Sheet 1.

C. NIELSON & R. A. BERGER.
BENDING MACHINE.

No. 578,416. Patented Mar. 9, 1897.

Witnesses

Inventors
Christen Nielson
Richard A. Berger
By Schreiter & Van Iderstine
Attorneys.

(No Model.) 2 Sheets—Sheet 2.
C. NIELSON & R. A. BERGER.
BENDING MACHINE.
No. 578,416. Patented Mar. 9, 1897.
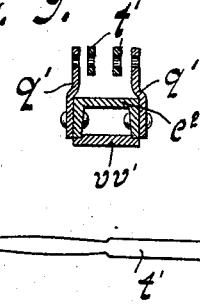
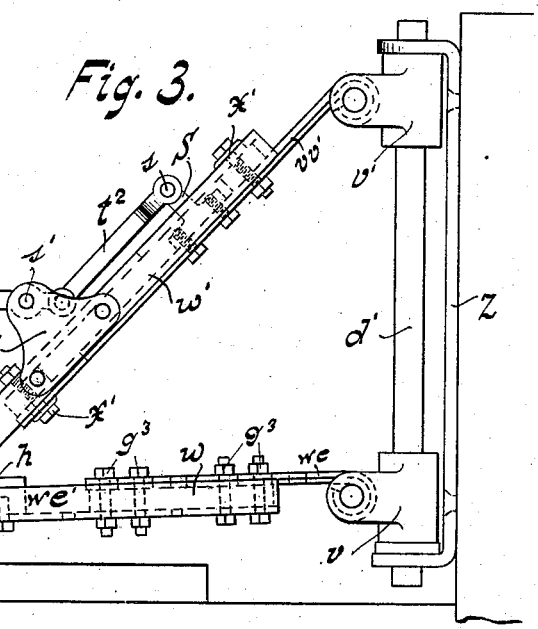
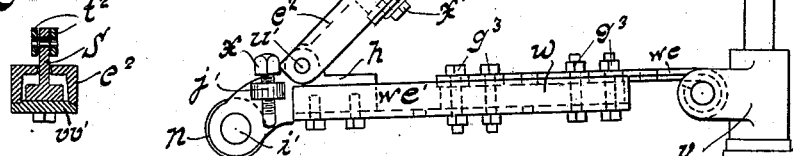
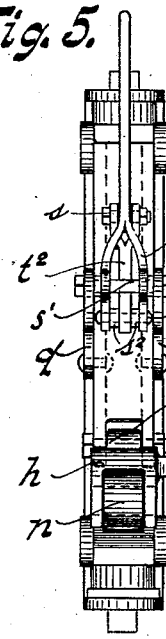
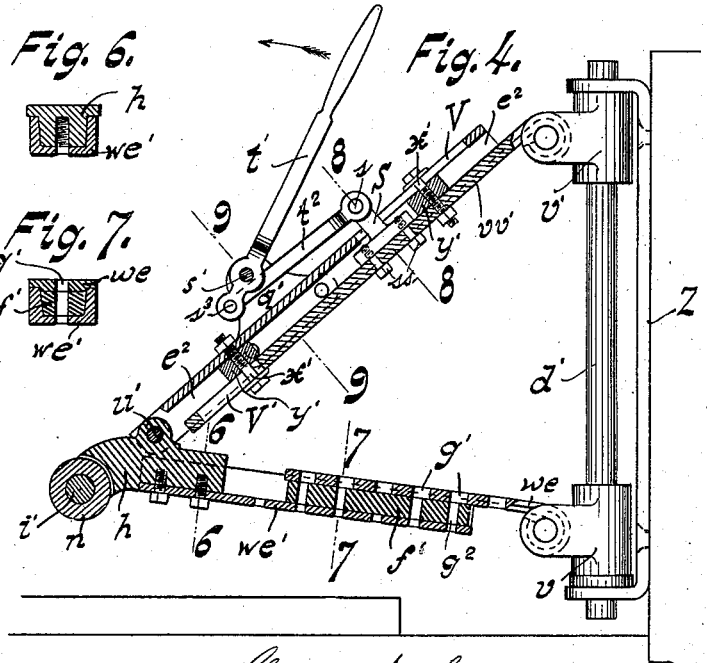
Witnesses
Inventors: Christen Nielson, Richard A. Berger
By Schreiter & Van Iderstine, Attorneys.

UNITED STATES PATENT OFFICE.

CHRISTEN NIELSON AND RICHARD A. BERGER, OF BROOKLYN, NEW YORK.

BENDING-MACHINE.

SPECIFICATION forming part of Letters Patent No. 578,416, dated March 9, 1897.

Application filed September 19, 1896. Serial No. 606,432. (No model.)

*To all whom it may concern:*

Be it known that we, CHRISTEN NIELSON and RICHARD A. BERGER, of Brooklyn, county of Kings, and State of New York, have invented certain new and useful Improvements in Bending-Machines, of which the following is a full, true, and exact specification.

Our invention relates to metal-working machines; and it consists of the hereinafter-described machine for bending of flat or channel iron.

Figure 1:
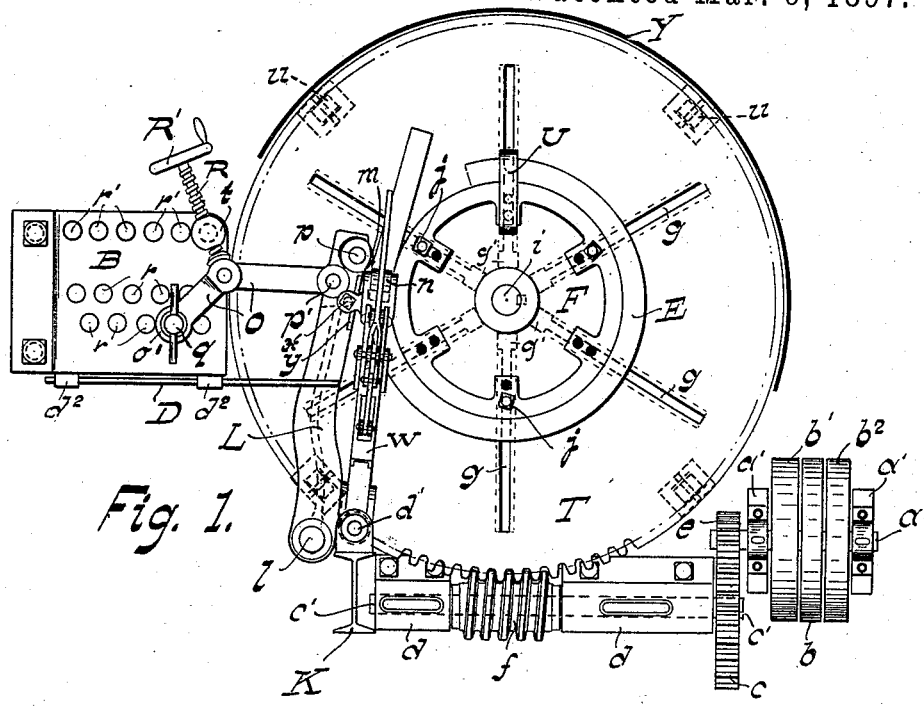
Figure 2:
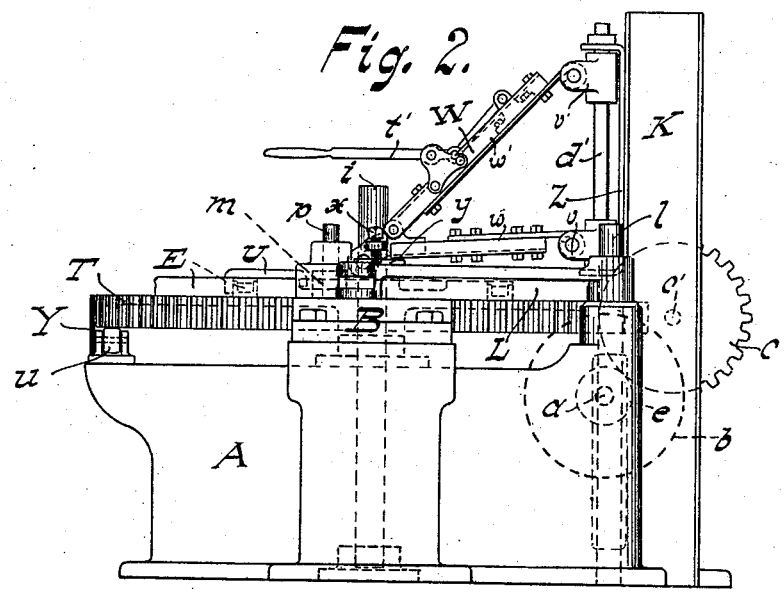

In the accompanying drawings, Figure 1 is a top view, and Fig. 2 a side elevation, of our improved bending-machine. Fig. 3 is an enlarged detail side view of the extensible lever-bracket for holding the material to the platform; Fig. 4, a vertical longitudinal section thereof; Fig. 5, a front view of the arm in uplifted position. Figs. 6, 7, 8, and 9 are sections on lines 6 6, 7 7, 8 8, and 9 9, respectively, indicated in Fig. 4.

Our improved bending-machine consists, mainly, of the rotary platform T, worm-gear $f$, exchangeable mandrel or form disk F, lever L, plate B, and the extensible lever-bracket W.

The parts of the machine are arranged in and upon the frame A as follows:

Platform T is rigidly keyed to the vertical shaft $i$ and rotates with it. Rollers $u$, pillowed in bearings secured on shoulders provided on the legs of the frame, support the platform on its circumference. The platform T is rotated by worm $f$, rigidly secured to the shaft $c'$, pillowed in bearings $d$. Shaft $c'$ is driven by cog-wheel $c$, rigidly secured thereto, and driven in turn by cog-wheel $e$, keyed to the shaft $a$, driven by a belt passing over the pulley $b$. Besides the driving-pulley $b$ there are two loose pulleys $b'$ and $b^2$, set on shaft $a$, one carrying a straight and the other a cross-belt, and by shifting the straight belt over the pulley $b$ the platform T is started. The motion is reversible by shifting the crossed belt over pulley $b$, and vice versa.

Shield Y is attached to the frame A to cover the gear on the circumference of platform T and protect the operator of the machine.

Diametrical T-slots $g$, having widened apertures $g'$ nearest the center of the platform T, serve for securing to the platform the form disk or mandrel F by means of bolts $j$. Disk F serves as a pattern for the bending of the material, and its shape and size correspond with the shape and size to which the material is to be bent.

Lever L, pressing the material against disk F, is pivoted on the vertical shaft $l$ and is operated by the hand-wheel R', turning screw R, passing through block $t$ and coupled to the vertex of the toggle-joint O, having one end $o'$ secured in corresponding position by stop-pin $q$, passing through it into one of the holes $r$ in plate B. Screw R passes through the screw-threaded block $t$, whose stem is fitted into the holes $r'$ in the same plate B.

The position of the lever L will change according to the size of the disk F, and to facilitate a proper adjustment of the position of the toggle-joint holes $r$ and $r'$, provided in the plate B, are arranged in rows, thus admitting to change the position of the block $t$ and also of the pin $q$, fixing the end and vertex of the toggle-joint O, respectively. In a notch provided on the end of lever L is set the antifriction-roller $m$, and the strip of material while in the process of bending glides thereon. Bar D, sliding in bearings $d^2$, holds down the lever L and resists its tendency upward, thus relieving the strain upon the shaft $l$.

The downward extensible lever-bracket W (shown in Figs. 3 to 9, inclusive) is devised to hold the strip of iron while in process of bending securely to the rotating platform T and to prevent its slipping over the edge of disk F under the pressure exerted on it by lever L. This bracket W swings on vertical shaft $d'$, secured in frame Z, screwed to post K, forming a part of the frame of the machine, and consists of the arms $w$ and $w'$, movably joined in head $h$ and hinged to collars $v$ and $v'$, set on vertical shaft $d'$. The relative positions of the several parts of lever-bracket W are illustrated in Figs. 6, 7, 8, and 9, showing different sections of the arms.

The lower arm $w$ is composed of a flat bar $we$, hinged to collar $v$, and of the bar $we'$, of channel-iron, adjustably secured thereto and joined to the head-block $h$, carrying roller $n$, rotating on pin $i$ and joined by pin $u$ to the upper arm $w'$. The joint between the bars $we$ and $we'$ is reinforced by bar $f'$, and for longitudinal adjustment in the connection between bars $we$ and the bar $we'$ slots $g'$ are provided in the bar $we$ corresponding with the holes $g^2$ of bar $we'$, wherein screw-bolts $g^3$ are set. The upper arm $w'$ is composed of bar $vv'$, joined to bar $e^2$, made also of channel-iron, by screw-bolts $x'$. Washers $y'$, set on the bolts between the webs of the bar, serve to prevent its distortion under strain. Slots V and V', provided in the bar $e^2$ and $vv'$, respectively, permit a sliding motion of this bar $e^2$ in relation to bar $vv'$ for the purpose of lifting and lowering head $h$ to and from the platform T. This motion is produced by lever $t$, fulcrumed on pin $s'$ and having its shorter arm connected to link $t^2$, hinged on pivot $s$ to the standard S. Link $t^2$ is hinged between the tines of the forked shorter end of lever $t'$ between washers $s^2$, and the link $t^2$ is also forked on its end to increase the extent of its bearing.

Bolt $s^3$, connecting lever $t'$ with link $t^2$, is riveted, whereas the bolt $s$, connecting link $t^2$ to standard S, and also $s'$, forming the fulcrum for lever $t'$, are screw-bolts. Brackets $q'$, wherein pin $s'$ is pillowed, are riveted to the bar $e^2$, and standard S, projecting through the slot V, is screwed to the bar $vv'$. Thus when lever $t'$ is in the position shown in Fig. 4 the bar $e^2$ is drawn upward, and with it also the head $h$, connected to it by pin $u'$. By moving the lever $t'$ downward, as indicated by the arrow in Fig. 4, bar $e^2$ is moved downward and roller $n$ pressed upon the iron inserted between disk F and roller $m$, thus keeping it firmly upon the platform T. Set-screw $x$, set in boss $j'$, attached to head $h$, engages against raised flange $y$ of lever L and maintains bracket W in position when the machine is used.

The operation of the machine is as follows: The end of a strip E to be bent or rolled is clamped to the disk F by clamp U. Lever L is adjusted by placing in corresponding holes $r$ and $r'$, respectively, the pin $q$ and the stem of block $t$ and turning screw R to press roller $m$ tightly against the strip E. Bracket W, normally held in uplifted position, is swung over the strip, and lever $t'$ is turned down, thus bringing roller $n$ to bear against the strip, and then the platform is started. Disk F being rigidly secured to the platform T, the strip E is drawn in and bent by the pressure of roller $m$ in conformity with the size and shape of pattern-disk F. When the strip is nearly wound around the disk F, the clamped end is released and lifted upward to allow the other end to pass underneath, because the mandrel-disk F is always somewhat smaller than the size of the circle required to compensate for the rebounding of the bent when released from the pressure and to allow for the welding of the joints of the coil.

We claim as our invention and desire to secure by Letters Patent—

1. A bending-machine comprising a suitable frame, a shaft vertically pillowed therein, a rotatable platform, secured to the shaft, rollers supporting the platform, pillowed in the frame of the machine, gearing for rotating the platform, an exchangeable disk, serving as a pattern or mandrel, and secured concentrically to the platform, a horizontally-movable arm, pivoted on a shaft, set in the frame, a roller, set on the end of the arm and a toggle-joint, hinged thereto, a screw, operating the toggle-joint, a stationary plate, secured upon the frame, adjoining the rotary platform and provided with rows of holes for securing the toggle-joint and the screw-block for operating the toggle-joint in required position, a swinging lever-bracket, composed of extensible arms, a head-block, rigidly secured to the lower arm of the lever-bracket and pivoted to the upper arm, a roller set in this head-block and projecting therefrom, and means for raising and lowering the lever-bracket to and from the platform, and means for holding the roller in position on the platform.

2. In a bending-machine the combination with a rotatable platform, an exchangeable pattern-disk, secured concentrically to the platform, and with a horizontally-movable arm, having a roller secured thereto, of an adjustable toggle-joint, hinged to the lever, a screw-block and a screw, winding through the screw-block and operating the toggle-joint.

3. In a bending-machine the combination with a rotatable platform, an exchangeable pattern-disk, secured concentrically to the platform, and with a horizontally-movable arm, having a roller secured thereto, and with an adjustable toggle-joint, hinged to the lever, a screw-block and a screw, winding through the screw-block and operating the toggle-joint, of a stationary plate, provided with series of holes, adapted to receive the pin, fixing the end of the toggle-joint, and the stem of the screw-block for the purpose of adjusting the position of the toggle-joint correspondingly with the exchangeable pattern.

4. In a bending-machine the combination with a rotatable platform, an exchangeable pattern-disk, secured concentrically to the platform, and with a horizontally-movable arm, having a roller secured thereto, and with an adjustable toggle-joint, hinged to the lever, a screw-block and a screw, winding through the screw-block and operating the toggle-joint, and with a swinging lever-bracket, carrying a roller-bearing head, of an extensible brace, composed of two alternately-slotted bars and held together by two screw-bolts, each bolt being fixed in one bar and sliding in a corresponding slot of the other bar, a lever fulcrumed on a pin pillowed in blocks, secured to one of these bars, a link, hinged to the shorter arm of the lever and connected to a standard secured to the other bar, whereby the bracket may be lengthened or shortened by changing the position of the lever.

5. In a bending-machine comprising a suitable frame, a shaft vertically pillowed therein, a rotatable platform, secured to the shaft, rollers supporting the platform, pillowed in the frame of the machine, gearing for rotating the platform, an exchangeable disk, serving as a pattern or mandrel, secured concentrically to the platform, a horizontally-movable arm, pivoted on a shaft, set in the frame, a roller, set on the end of the arm and a toggle-joint, hinged thereto, a screw, operating the toggle-joint, a stationary plate, secured upon the frame, adjoining the rotary platform and provided with rows of holes for securing the toggle-joint and the screw-block for operating the toggle-joint in required position, a swinging lever-bracket, composed of extensible arms, a head-block, rigidly secured to the lower arm of the lever-bracket and pivoted to the upper arm, a roller set in this head and projecting therefrom, and means for raising and lowering the lever-bracket to and from the platform, the combination with the swinging lever-bracket, carrying a roller in its projecting end, of a set-screw, set in a boss attached to the end of the bracket and adapted to engage against the horizontal lever, thereby sustaining the swinging lever-bracket in position.

CHRISTEN NIELSON.
RICHARD A. BERGER.

Witnesses:
A. W. KURZ,
E. C. NIELSON.